United States Patent Office 3,373,101
Patented Mar. 12, 1968

3,373,101
FRIEDEL-CRAFTS CATALYST PLUS BITUMEN TO PRODUCE PITCH OF INCREASED BETA RESIN CONTENT
Hillis O. Folkins and John W. Walsh, Crystal Lake, Ill., assignors, by mesne assignments, to Union Oil Company of California, Los Angeles, Calif., a corporation of California
No Drawing. Filed Jan. 24, 1964, Ser. No. 339,905
14 Claims. (Cl. 208—40)

This invention relates to the production of improved petroleum pitches and, more particularly, to the production of petroleum pitches which are more comparable to coal tar pitches than petroleum pitches produced by conventional methods. The pitches which are prepared in accordance with this invention are especially useful as binders in forming carbon and graphite bodies.

In the production of molded carbonaceous bodies, such as carbon electrodes, carbon brushes, briquettes used as reducing agents in the smelting of ores and the like, finely ground carbon and other ingredients are mixed with a pitch-like binder to produce a plastic composition which is then molded to the desired shape. The molded product is baked to drive off the volatile matter of the binder and carbonize the same, leaving a solid compact mass.

It has been learned from experience in the art of producing molded carbon articles that the nature and quality of the binder used is extremely critical. The binders must possess certain critical characteristics, including (1) a softening point high enough, i.e., about 180° to 260° F., so that the green molded body will not be deformed during its subsequent baking, (2) a high carbon residue, i.e., at least about 50 wt. percent (Conradson) so that a large percentage of the binder is converted into carbon during the subsequent baking and/or graphitization of the green molded body, and (3) a high, viz, about 20 wt. percent, distributed beta resin content (defined by the difference between the benzene insoluble content and the quinoline insoluble content) so that the binder possesses the desired degrees of wettability, adhesiveness and body for good molding. In addition, a benzene insoluble content of about 30 wt. percent and a quinoline insoluble content of about 10–14 wt. percent are desirable.

Heretofore, pitches derived from petroleum have been found to be unsatisfactory as binders for carbon bodies and, consequently, pitches of coal tar origin have been used almost exclusively for the preparation of binders. Pitches prepared from coal tar usually possess the above-defined desired characteristics, but if not, the coal-tar pitches may be further thermally treated in the presence of catalysts such as aluminum chloride, other halides and nitro-compounds to increase the carbon residues, benzene insolubles and softening points of the pitches. In contradistinction, petroleum pitches often have low resins content when the precursor residuals are processed to give pitches of suitable carbon residues and softening points.

This invention is based on the discovery that satisfactory binder pitches for the production of electrodes and other molded carbonaceous articles can be prepared from petroleum bituminous materials by thermal treatment under controlled conditions and in the presence of a small amount of a condensation catalyst. The petroleum pitches produced in accordance with this invention have high resin contents and high carbon residues at the desired softening point. Under other conditions, the resin content merely increases as a function of softening point.

It is therefore the primary object of this invention to provide a process for producing a binder pitch from petroleum.

Another object of this invention is to provide a process for producing a binder pitch from petroleum which compares favorably with pitches of coal tar origin.

Still another object of this invention is to provide a process for producing petroleum pitches which have high resin contents and high carbon residues at the desired softening point.

A still further object of this invention is to provide a process for producing a petroleum pitch which is suitable as a binder in the forming of carbon and graphite bodies.

These and further objects of this invention will become apparent or be described as the description thereof herein proceeds.

In accordance with this invention, satisfactory petroleum base pitches are produced in high yields by the thermal degradation of a petroleum bituminous feed stock under controlled operating conditions and in the presence of a condensation catalyst. The precursor petroleum bituminous material from which the binder pitches of this invention are prepared include petroleum residual oils, tars or asphalts produced by the cracking or non-cracking distillation of petroleum, residual asphaltic materials from the destructive hydrogenation of petroleum, and asphaltic materials separated from petroleum by means of agents such as naphtha, liquefied normally gaseous hydrocarbons, e.g., butane, propane and like, or other precipitation agents. A preferred petroleum refinery stock which yields a suitable pitch is the bottoms fraction obtained by distillation of the cracked oil produced from cracking operations, such as catalytic cracking operations which take place in the presence of a silica-alumina catalyst. Other preferred stocks include the vacuum bottoms obtained from the thermal cracking of virgin or catalytic cracked gas oils. Still other preferred stocks are the bottoms materials from the cracking of naphtha and hydrocarbon gases such as ethane, propane and butane at high temperatures to form olefins such as ethylene or propylene.

The thermal degradation of the petroleum bituminous material is preferably carried out by a destructive distillation procedure at atmospheric pressure or superatmospheric pressure, e.g., about 15 to 100 p.s.i.g., and preferably 15–40 p.s.i.g. under controlled conditions of temperature in the presence of a suitable catalyst. In general, the precursor bituminous material is heated to a temperature of about 650° to 850° F., preferably about 725° to 850° F. for a period of time sufficient to produce pitch of the desired softening point. Lower temperatures will generally be ineffective in promoting the condensation reactions to produce a satisfactory binder pitch. On the other hand, temperatures higher than those of this invention will produce a pitch of unsatisfactory low softening point and resin content due to the predominating cracking influence of the catalyst upon pitch precursors under these conditions.

The time during which the petroleum residual or tar feed stock is subjected to the thermal degradation and distillation treatment will depend on the other variables such as temperature, pressure, and the specific catalyst utilized, but in general will be about 0.2 to 4.0 hours depending upon the final temperature employed. It will be evident that the heating time is also directly dependent upon the desired softening point of the petroleum pitch prepared according to this invention. For example, at a given heating temperature and pressure, the softening point of the product pitch will be increased as the heating time increases.

The catalyst employed is generally of the halide-type included under the term "Friedel Crafts." Although anhydrous aluminum chloride is especially effective, examples of other catalysts which may be utilized include anhydrous ferric chloride, anhydrous stannic chloride, boron fluoride, and zinc chloride. The amount of the catalyst utilized will range from about 0.1 to 5.0 wt. percent, preferably 0.2 to 3.0 wt. percent, of the charged residual. Lower concentrations of the catalyst generally are not effective for increasing both the quantity and quality of the pitch, while higher concentrations tend to promote excessive cracking and coke formation, thus adversely affecting pitch quality.

Although the majority of the undesirable unreacted material is taken overhead by virtue of the high processing temperatures, supplemental means such as steam stripping, vacuum distillation or solvent de-oiling can be used to remove additional material.

In general, the binder pitches produced in accordance with this invention can be characterized as having softening points (as determined by Ring and Ball (ASTM:D-36) test) of about 180 to 250° F., a carbon residue (Conradson) of about 50 to 65 wt. percent, benzene insolubles of about 25 to 42 wt. percent, quinoline insolubles of about 8 to 18 wt. percent, and beta resins of about 17 to 24 wt. percent.

To demonstrate the effectiveness of the process of this invention, several experiments were conducted in which several samples of a petroleum tar obtained as bottoms from the thermal cracking of mixed virgin gas oils and catalytically cracked cycle stocks were thermally treated for 1.2 hours at atmospheric pressure at different temperatures. Table I contains a tabular summary of tests which were conducted to characterize the product pitches.

TABLE I

| Runs/Catalyst, Including Concentration | Temp., °F. | | Pitch Yield, wt. Percent | Properties of Pitch | | | | |
|---|---|---|---|---|---|---|---|---|
| | Oil | Overhead | | Soft. Pt., °F. | Carbon Res. (Conradson), wt. Percent | Benzene Insol., wt. Percent | Quinoline Insol., wt. Percent | Beta Resins |
| (1) None | 836 | 732 | 25.4 | 194 | 48.9 | 14.5 | 1.7 | 12.8 |
| (2) AlCl₃(2.0%) | 738 | 660 | 38.0 | 220 | 58.2 | 42.0 | 18.0 | 24.0 |
| (3) AlCl₃(2.0%) | 827 | 577 | 44.9 | 202 | 47.3 | 29.6 | 13.1 | 16.5 |
| (4) AlCl₃(2.0%) | 877 | 639 | 38.5 | 121 | | 7.9 | 2.8 | 5.1 |

In reviewing Table I, it will be evident that it is necessary to utilize an anhydrous organic halide catalyst to prepare a suitable binder pitch. This may be seen by comparing the pitch of Run 1, where no catalyst was utilized, with the pitches of Runs 2 and 3, which were prepared in accordance with this invention. It can also be seen from Runs 2 and 3 that the heating temperature utilized directly affects the product pitch. For example, when the feed stock of Run 2 was heated at 738° F. the product pitch had a softening point of 220° F., while the heating of the same residual at 827° F. in Run 3 resulted in a pitch having a softening point of 202° F. Run 4 clearly demonstrates that unsatisfactory pitches are obtained when the feed stock is heated at too high a temperature. The data in Table I also demonstrate the efficiency of the catalyst in improving pitch yields. Since pitch yields normally decrease as the softening point is increased, it would be expected that the yield of pitch in Run 2 would be less than that obtained in Run 1. However, a pitch yield of 38.0% was obtained in Run 2 versus 25.4% yield in the non-catalyzed experiment of Run 1. The increase in yield is more clearly demonstrated by a comparison of Runs 1 and 3. In this comparison pitches of approximately the same softening points were obtained. However, the pitch yield in the catalyzed Run 3 was 44.9% as compared to the 25.4% yield of non-catalyzed Run 1.

The embodiments of this invention in which an exclusive property or privilege is claimed are defined as follows:

1. A process for the preparation of a petroleum pitch which comprises heating a cracked petroleum bituminous material at a temperature of about 650° to 850° F. in the presence of a Friedel Crafts catalyst, the concentration of said catalyst being about 0.1 to 5.0 wt. percent of the petroleum bituminous material until a pitch having a softening point of 180° to 250° F. and a beta-resin content from 17 to 24 percent is produced and recovering said pitch from said process.

2. A process in accordance with claim 1 in which said cracked petroleum bituminous material is of the group consisting of petroleum residual oils, petroleum tars and petroleum asphalts.

3. A process in accordance with claim 2 in which said cracked petroleum bituminous material is a petroleum tar.

4. A process in accordance with claim 2 in which said cracked petroleum bituminous material is a petroleum residual oil.

5. A process in accordance with claim 4 in which said cracked petroleum bituminous material is obtained from the distillation of the cracked oil produced by the catalytic cracking of petroleum oils.

6. A process in accordance with claim 1 in which said cracked petroleum bituminous material is heated for about 0.2 to 4.0 hours.

7. A process in accordance with claim 6 in which said cracked petroleum bituminous material is heated at a temperature of about 725° to 850° F.

8. A process in accordance with claim 1 in which said catalyst is an anhydrous inorganic halide.

9. A process in accordance with claim 8 in which said catalyst is a metal halide.

10. A process in accordance with claim 9 in which said catalyst is aluminum chloride.

11. A process in accordance with claim 1 in which said catalyst is present in a concentration of about 0.3 to 3.0 wt. percent of the petroleum bituminous material.

12. A process for the preparation of a petroleum pitch which comprises heating a feed stock of the group consisting of cracked petroleum residual oils, cracked petroleum tars, and cracked petroleum asphalts for about 0.2 to 0.4 hour at a temperature of about 725° to 850° F. in the presence of an anhydrous inorganic halide catalyst, the concentration of said catalyst being in the range of about 0.3 to 3.0 wt. percent of the feed stock and recovering a pitch from said process having a softening point of 180° to 250° F. and a beta-resin content from 17 to 24.

13. A process in accordance with claim 12 in which said feed stock is obtained from the distillation of the cracked oil produced by the catalytic cracking of petroleum oils.

14. A process for the preparation of a petroleum pitch which comprises heating a petroleum tar obtained as a heavy residual from the thermal cracking of a mixture of virgin gas oil and light cycle stock from catalytic cracking, for about 1.2 hours at a temperature of about 827° F. in the presence of aluminum chloride in an amount of 2.0 wt. percent of the feed stock and recovering said pitch from said process.

References Cited

UNITED STATES PATENTS

| 3,223,618 | 12/1965 | Convery et al. | 208—44 |
| 3,258,418 | 6/1966 | Pitchford et al. | 208—44 |
| 2,287,511 | 6/1942 | Burk et al. | 208—44 |
| 2,992,181 | 7/1961 | Renner | 208—22 |

FOREIGN PATENTS 506,665  10/1954  Canada.

DANIEL E. WYMAN, *Primary Examiner.*

P. E. KONOPKA, *Assistant Examiner.*

UNITED STATES PATENT OFFICE
CERTIFICATE OF CORRECTION

Patent No. 3,373,101

March 12, 1968

Hillis O. Folkins et al.

It is certified that error appears in the above identified patent and that said Letters Patent are hereby corrected as shown below:

Column 4, line 43, for "0.4" read -- 4.0 --.

Signed and sealed this 24th day of June 1969.

(SEAL)
Attest:

Edward M. Fletcher, Jr.
Attesting Officer

WILLIAM E. SCHUYLER, JR.
Commissioner of Patents